United States Patent [19]
Bridges

[11] 3,980,984
[45] Sept. 14, 1976

[54] UNDERWATER CONNECTOR

[75] Inventor: Robert M. Bridges, Northridge, Calif.

[73] Assignee: The Bendix Corporation, North Hollywood, Calif.

[22] Filed: Sept. 18, 1972

[21] Appl. No.: 290,203

[52] U.S. Cl. .............................. 340/8 R; 339/94 R
[51] Int. Cl.$^2$ .............................. H04B 13/00
[58] Field of Search .............................. 340/8–14; 310/9.1; 339/94, 89, 90

[56] References Cited

UNITED STATES PATENTS

| | | | |
|---|---|---|---|
| 2,384,465 | 9/1945 | Harrison | 340/10 |
| 2,846,496 | 8/1958 | Baumgartner et al. | 340/10 UX |
| 2,919,420 | 12/1959 | Snodgrass et al. | 339/94 R |
| 3,343,122 | 9/1967 | Drogo | 339/94 C |
| 3,566,346 | 2/1971 | Scopatz | 340/8 |
| 3,594,701 | 7/1971 | Ramsey | 339/94 R |
| 3,617,986 | 11/1971 | Becker | 339/94 A |

*Primary Examiner*—Harold Tudor
*Attorney, Agent, or Firm*—William F. Thornton

[57] ABSTRACT

A connector assembly is disclosed which serves both to mount a piezoelectric element at a distance from an electronic housing and to complete an electrical circuit between them. The preferred form is made part of a submersible sonic transducer which has a central housing for electronics which is surrounded by a baffle on which an array of piezoelectric staves are mounted. The connector permits plug-in replacement of piezoelectric elements in an arrangement that is especially rigid when assembled to insure effective operation of seals against the entry of sea water.

5 Claims, 3 Drawing Figures

UNDERWATER CONNECTOR

This invention relates to improvements in electrical connectors for underwater sonar applications. It relates particularly to a structure which serves both as a mechanical and as an electrical interconnection and which is capable of ready assembly and disassembly.

An application for such an apparatus is found in underwater sound systems. Such systems employ piezoelectric elements which serve as transducers to convert electricity to sound and sound to electricity. When a piezoelectric element is electrically energized its physical dimensions are altered slightly. The dimensional change is so rapid that a rarefaction or compression of the water results adjacent to the element and a sound wave or sonic signal is originated. The piezoelectric element can also operate as a receiver in that sonic energy traversing through the water and impinging on the piezoelectric element changes its dimension and results in the generation of electrical signals.

When the element is to be used as a transmitter of sonic signals, it is energized by an electronic signal generator. When the piezoelectric element is used as a hydrophone for receiving sonic signals, the element is associated with a receiver or processor of electric signals. It is usually desirable to place the transmitter and the receiver in close proximity to the piezoelectric element. In that circumstance both the electronic processing apparatus and the piezoelectric element must be submerged. However, they are housed separately because satisfactory coupling of the piezoelectric element to the water is most easily accomplished when the element is completely surrounded by water. The electronic processing apparatus is housed in a sealed container and that container becomes the base or frame of the assembly. It is generally stronger and heavier than the piezoelectric element structure whose design is dictated by the need for matching of the impedance of the piezoelectric element to the impedance of the water in which it is immersed. In practice, the resulting total structure is one in which the piezoelectric element is mounted as an appendage on the container for the electronic apparatus. It is mounted at a distance from the container so need arises for an attaching structure by which the piezoelectric element can be held in position mechanically and through which electrical signals can be communicated between the element and the electronic unit.

In one practical example, a sonic transmitter and receiver are connected at the end of a cable. This apparatus is carried by a helicopter or by a surface vessel or some other platform. It can be lowered so that the transmitter and receiver enter the sea to be used to transmit and to receive sonic signals for any of a variety of purposes. Those purposes include detection and communication with submarines, location and activation of valves in undersea pipelines, location of fishes or apparatus, acoustic navigation and other uses.

The apparatus is made direction sensitive by mounting a number of piezoelectric elements on a central electronic container so that they extend radially from the container. To determine the direction to a distant source of sonic signals the several piezoelectric elements would be connected to the receiver in sequence. The amplitude of the signal reaching the several elements would be compared to identify the element receiving the strongest signal. In a more sophisticated arrangement, spaced pairs of piezoelectric elements would be connected to the receiver and the received signals strengths would be compared. The direction of the signal source would be deduced from the results of that comparison. In one practical example the electronic apparatus is housed in a central container approximately a foot in diameter and 2½ feet long. That container is surrounded by a coaxial shield which is spaced from it by a selected distance. The piezoelectric elements are mounted on that shield. The elements are long and rod-like and are referred to as "staves." They are mounted outwardly from the shield in radial planes that contain the axis of the unit. One or two dozen staves are employed. Each is attached to the shield but is spaced from it so that, except for the connecting bracketry, each stave is completely surrounded by water. The separation between stave and shield and the separation between shield and the container of electronics is selected to provide a desired acoustic effect. The net result, in one design, is that the piezoelectric stave is mounted about an inch from the shield. The shield in turn is mounted 2 or 3 inches from the 12-inch diameter electronic housing. The unit must include some kind of bracket which interconnects the electronic housing shield and the stave and which also permits electrical connection to be made from the stave to the interior of the central housing.

The provision of that interconnecting structure is complicated by the fact that the piezoelectric staves are inherently frail and are subject to malfunction as a consequence of the rough handling they receive in being lowered into and raised from the ocean. The helicopter is not always stationary as the unit enters and leaves the water so rough treatment is not unusual. Staves are damaged and become inoperative with a frequency that makes it very desirable to have the kind of connection between stave and electronic unit that permits ready replacement of inoperative staves.

Making the staves easily replaceable is not without its problems. What is required is an electrical connector between stave and inner electronic container which can be easily disconnected but which is waterproof so that sea water, which is both conductive and corrosive, will be excluded. A mechanical connection is also required. The mechanical connection must be capable of maintaining proper spacing and providing a requisite strength and rigidity while enabling ready connection and disconnection. It is easy to conclude that a "plug-in" type of connection in which the mechanical and electrical connections are accomplished simultaneously is desirable. However, providing a plug-in structure, or any other kind of readily connected structure, which can withstand substantial water pressure without leaking has proven to be difficult. For many years underwater sound units of this kind have been provided with interconnecting parts that were fixed firmly to the stave and extended without a break to the interior of the electronics housing where fastening elements were located. The construction required opening of the electronic housing to reach the fasteners. The result was that for years replacement of staves was a major overhaul task to be accomplished at a major overhaul and repair facility or even at the manufacturer's plant. An object of the invention is to overcome that difficulty and to provide an innerconnection structure that will permit field replacement of piezoelectric staves and which will be so foolproof and reliable that the unit can be placed in service after replacement of a stave without any need to test for integrity of the connection against sea water intrusion.

The invention provides a structure that meets that objective. It provides a very rugged and very reliable connection in a sufficiently foolproof structure so that no special skill is required to install a watertight and entirely functional replacement in the field without any special facility or tool.

The preferred embodiment selected for illustration in the accompanying drawings has another advantage. Its structure cooperates with that of the baffle in a way that protects the connector assembly from vibration at the point where its mating parts are joined. Over most of its height the baffle consists of a single sheet of plastic material. However, at its upper and lower ends the baffle is formed with a heavy flange. The connector assembly extends through the lower flange and the part, a coupling, that is used to interconnect the parts of the assembly is also used in securing the assembly to the flange.

In the completely assembled unit, the piezoelectric staves are held tightly against the outside periphery of the upper and lower flanges of the baffle. The flanges extend outwardly from the main body of the baffle so that the intermediate portion of each stave is spaced from the baffle. Part of the plug-in connector assembly is fixed to the stave and the other part is fixed to the central housing. That other housing part includes elements which plug together with those held on the stave and it includes a stem or tube which extends from the interconnecting structure back toward the housing. Thus the point at which the interconnecting elements are located is spaced some distance from the housing. A coupling is used to clamp the mating parts together. The coupling fits within an opening that extends through the flange of the baffle. The mating parts that account for mechanical interconnection are carried one by the stave and the other by the housing. They are arranged in a manner such that when they are mated a proper alignment is assured. Proper alignment is required to insure trouble-free and effective interconnection of the electrical interconnecting parts which are carried inside of the cup-shaped mating elements and to insure effective function of the sealing members. The mating members are arranged so that part of the wall of one slides within the central opening of the other. The two members are provided with cooperating surfaces that seat upon one another when the parts are mated. The fact that one mating member seats upon another rather than upon a resilient sealing element insures that the relative position of all of the parts, when assembled, is exactly predictable.

The two mating parts are formed so that an annular cavity is created between them. That cavity has a special cross-sectional shape to accommodate an annular sealing member. The sealing member is compressed in the assembled structure to provide a seal notwithstanding that one of the mating members is bottomed against the other. That arrangement insures that the two mating parts are brought together in precise degree whereby position control is maintained and it also accomplishes the sealing task.

These and other objects and features and advantages of the invention will be apparent in the specification which follows.

Figure 1:
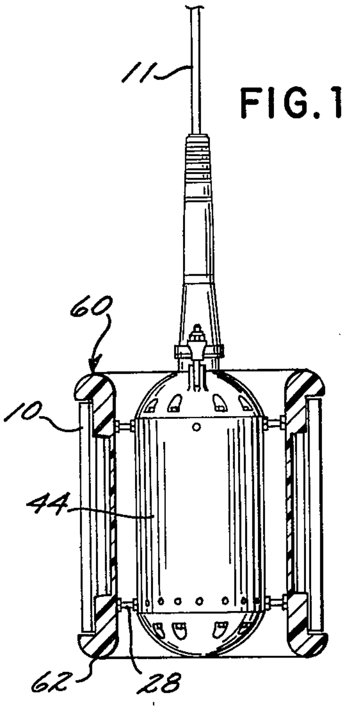
FIG. 1 is a view, partly in section, of a submersible sonic locator and a portion of its suspension cable.
Figure 2:
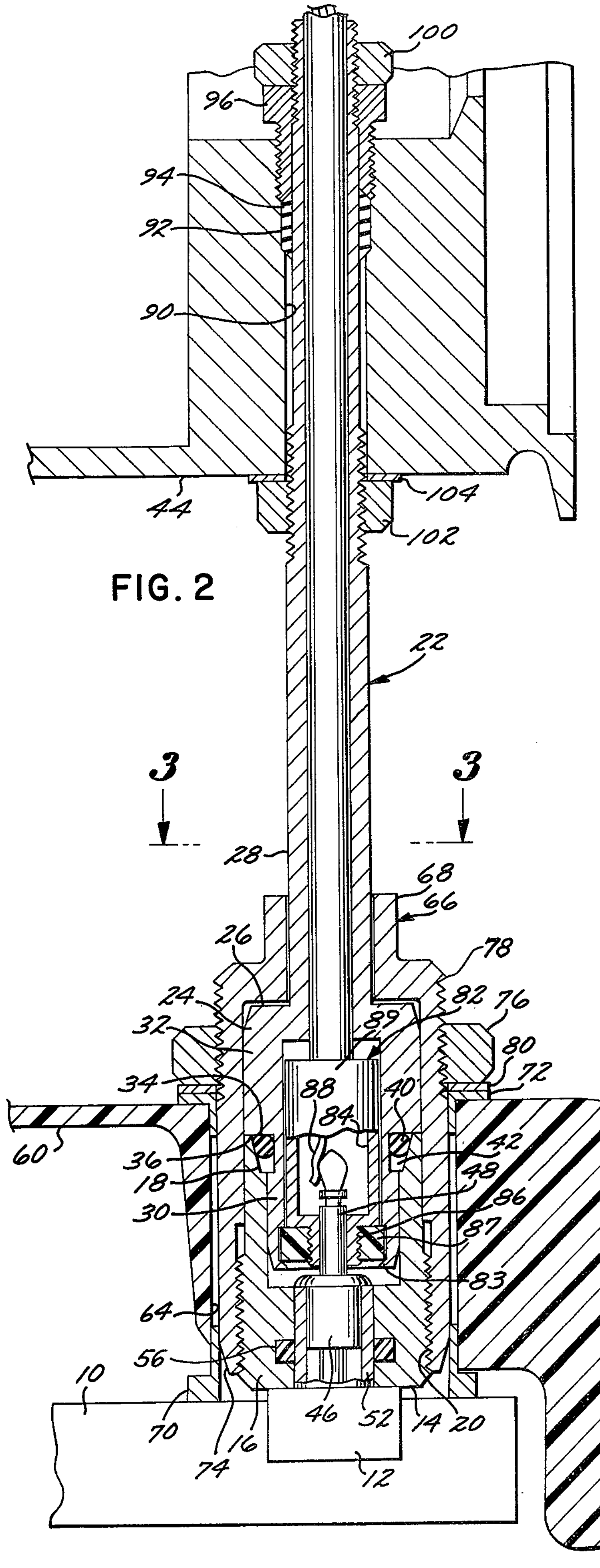
FIG. 2 is a cross-sectional view, showing a fragment of the electronic housing, a fragment of the piezoelectric stave, and a fragment of a baffle all interconnected by a connecting structure shown in vertical cross-section and constructed according to the invention.
Figure 3:
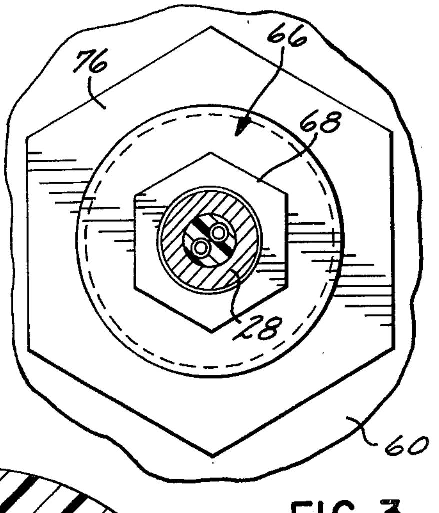
FIG. 3 is a cross-sectional view taken on line 3—3 of FIG. 2.

Approximately half of the baffle 60 has been removed in FIG. 1 so that it can be seen in cross-section and so the housing 44 is visible. The entire unit is suspended by a cable 11 so that its central axis is generally vertical. FIG. 2 depicts the lower left region of FIG. 1. It has been turned in the drawing to permit its being shown in enlarged scale.

The piezoelectric element is housed within a thin casing to form an assembly called a "stave." The stave is designated by the numeral 10. It is approximately 1 inch wide, three-eighths of an inch thick, and it is several feet long. At its lower inner end, the piezoelectric element and its casing are fixed to a U-shaped bracket 12 which embraces the rear side of the stave. That bracket is integrally formed with or, as in the case shown, is bonded to the bottom surface 14 of a cup-shaped mating member 16. That member is generally cylindrical. It has a thick bottom wall and its side walls have substantially uniform thickness over their length except at the forward or rim end where the inner surface is cut away to form a conical front surface 18 tapered toward the stave end. In the cross-sectional view, that surface is indicated by a sloping line that slopes to larger diameter toward the forward or rim end. The rearward part of the outer wall, the part of the wall toward the stave, is formed with external threads 20.

The other mating member is generally indicated by the reference numeral 22. It comprises a cup-shaped portion 24 that has a bottom wall 26. The stem 28 is considered to be part of the mating member 22. The cup-shaped portion 24 has reduced outside diameter in its forward region 30. This forward part of the mating member 22 has a diameter so that it fits with a sliding fit into the forward end of the member 16. In its rearward section 32 the side wall of cup-shaped member 24 has an outside diameter substantially equal to the outside diameter of the forward end of mating member 16. A shoulder 34 is formed at the juncture of the forward section 30 and the rearward section 32. That shoulder abuts mating shoulder 36 at the forward edge of the mating member 16. These two surfaces are shown to be perpendicular to the axis of the connector. That is the preferred arrangement although other shapes are possible. What is important is that the two mating shoulders be complementally formed so that one can seat upon the other firmly whereby the position of one member relative to the other is fixed.

The electrical connection is made between mating parts of an electrical connector housed within the axial opening of the two mating members. It is essential that water be kept from entering that space. To that end a seal is required and in this embodiment sealing is provided by an annular sealing ring 40. The ring is disposed in the annular space mentioned above that appears between the conical surface 18 of mating member 16 and the outer wall of mating member 22. The latter is formed with an annular groove 42 in the region that underlies the sloping surface 18. The opening is wedge-shaped in cross-section with its smaller width toward the stave 10. Before assembly the O-ring sealing member 40 is placed on the cup-shaped mating member 24 so that it encompasses that member and lies in the recess 42. When the mating parts are assembled the ring is forced toward the smaller end of the recess so that it is held in compression to effect a seal against intrusion of salt water.

In the preferred embodiment, the mating member that is attached to the electronic housing 44 is the one that has the outer end of reduced diameter to slip within the mating member that is fixed to the stave. However, although less desirable for practical reasons, the design can be reversed so that the side wall of the cup-shaped member 16 is formed instead like the side wall of cup-shaped member 24 and vice versa. Similarly, the male and female portions of the electrical connector can be interchanged and they can be interchanged whether or not the mechanical coupling members are reversed. The preferred form is shown in the drawing. In that form the male portion of the electrical connector is carried by mating member 16 and the stave 10.

The construction of the mating members of the mechanical connector provides a high order of rigidity in that a substantial length of the forward part of member 24 fits within the forward wall of the mating member 16 and two complementally formed surfaces, 34 and 36, are forced into contact. That and the conformations on those members that form the cavity in which the sealing member 40 is lodged insure that they and the sealing member will occupy the relative positions that the designer intended, regardless of how the two mating members were arranged or misaligned at the outset of the plug-in procedure.

The design of the mechanical connector is integrated with the design of the baffle 60. Whereas the stave is required to be spaced from the baffle at some selected distance over the length of the stave, the connector is fixed to the very end region of the stave where that spacing requirement is not imposed. In this region, the baffle width is increased greatly to form a protective bumper ring which extends below the plane of the electronic housing and serves as a protector for both the staves and the housing. That bumper ring portion of the baffle 60 is identified by the reference numeral 62. The ring is provided with a series of openings lying in a common horizontal plane and extending with their axis on radial lines radiating from the vertical axis of the electronic unit. One of those openings is visible in FIG. 2 where its inner wall is designated 64. The width of the bumper ring, and so the length of the hole, is more than half of the combined length of the mating elements 16 and 26. The connector extends through that opening and it is arranged so that the outside diameter of the connector assembly has a sliding fit within the opening whereby the baffle lends to rigidity to the mechanical connector.

In this embodiment the mating members 16 and 26 are clamped together with a couple here having the form of a barrel nut 66. The nut is generally cylindrical except that its inner end has reduced diameter to form a hexagonal collar 68. The inner wall of the collar has a diameter just larger than the outside diameter of tube 28. At its left end, the barrel nut 66 has larger inside diameter. It can be assembled with a sliding fit over the outside of the mating members 16 and 26. At the forward or left end of its inside diameter, the barrel nut is formed with internal threads that are capable of threaded engagement with threads 20 of mating member 16. The overall length of the barrel nut is such that it can be unscrewed from threaded engagement with threads 20 and then retracted so that its barrel portion slides over the mating members and its collar 68 is moved back over the tube 28. It can be retracted enough so that the barrel nut clears the mating members 16 and 26. The outer surface of the barrel nut, at its forward or left end, is smooth. Its diameter is just great enough to permit it to slide into the opening in the bumper ring. In this embodiment the baffle and its bumper ring are made of relatively soft material. For that reason, a grommet is inserted into the opening from each side. Each grommet has a cylindrical portion that fits within the opening of the baffle ring and a flange that extends away from the opening. The flange 70 at the stave side is permanently fixed to the stave. The grommet 72 at the inner wall of the baffle is press fitted into the baffle. The outer diameter of the barrel nut fits slidably within those two grommets. The forward, outer edge of the barrel nut is chamfered slightly at 74 to facilitate initial alignment of the barrel nut with the grommet 72.

Mating member 16 is fixed to the stave assembly 10. Mating member 26 is clamped in mating engagement with member 16 by the barrel nut 66. The assembly is completed by a nut 76, a castellated jam nut, which is threaded on external threads 78 at the upper end of the barrel nut. The jam nut 76 is tightened against the washer 80 which bears against the grommet 72. When that nut is drawn up tight so that it presses on grommet 72, forcing the baffle ring tightly against the grommet 70, the entire assembly becomes very rigid. The mechanical connector and the electrical connector within it are prevented from relative motion of a kind that might interrupt the electrical connections or that might interrupt operation of the seals. In this connection, the baffle ring is seen in FIG. 1 to abut the lower portion of the grommet 70 but to be spaced from the upper portion. In practice the upper wall is scalloped slightly to facilitate assembly but there is engagement of the baffle ring and the grommet around most of its periphery.

At its other end tube 28 is provided with two sets of external threads. One set is formed at the end of the tube where it emerges at the inside of the housing. The other set of threads is placed along the tube wall at the point where the tube emerges at the outside of the housing. The wall of the housing is bored at 90 to receive the tube. That bore has increased diameter in a region 92 to accommodate a packing gland 94 which is compressed by a compression fitting 96. Opening 90 has threads at its inner end which mate with those of the compression fitting. The tube having been inserted into the opening 90, the compression fitting is turned up tight so that gland 94 forms a seal against the entry of sea water into the housing. The tube is held in place in that assembly by a jam nut 100, which is turned against the end of the compression fitting 96 at the inside of the housing, and by a nut 102 at the outside of the housing where it is turned up tight against a washer 104 that bears against the housing.

The electrical connector comprises a jack and plug arrangement. In this embodiment the jack is a conventional two conductor female jack available commercially from a number of sources. The plug is also a standard, commercially available unit.

The plug is shown in FIG. 2. Its base 46 is insulated from the shank 48 of the plug by an internal insulating sleeve. The plug is assembled so that its base 46 is hermetically sealed by soft solder within a steel sleeve 52 which forms part of the stave assembly weldment. The sleeve 52 is silver soldered into the axial opening of the mating member 16 all to secure against the entry of sea water. Between the member 16 and the sleeve or bushing 52, an O-ring seal 56 is disposed in a recess formed in the inner wall of the member 16. The dimensions of the O-ring and the recess are such that the O-ring presses tightly against both member 16 and the sleeve 52 and prevents any leakage of water past the ring.

Notwithstanding the limited resilience in bushing 52 the plug is too rigid for normal operation of the jack 82. The jack has a cylindrical, metal body 84. It has a metal wall over its entry end and that end is fitted with a threaded nipple 86 and an axial opening to receive the plug. At the interior of the body 84 the end of the plug is engaged by a resiliently mounted contact 88. The bias of that contact is not symmetrical. In ordinary operation it tends to cant the plug to force its shank against the side walls of the nipple and the end wall. But in this case the plug is too rigidly mounted to cant. Instead, the jack is mounted, gimbal like, so that it can cant. The jack has an insulating, outer, cylindrical cover 89 which fits loosely enough in the interior of mating member 24 to permit it to cant. However, depth control is maintained by a spacer 87 which is screwed on the nipple 86. The rear peripheral face of the spacer is seated on a shoulder formed on the inner wall of the forward section 30 of member 24. Like the cover 89, the spacer has smaller diameter than the opening in which it fits so it can cant. The whole assembly is trapped in place by staking over several segments of the forward end of forward section 30 as shown at 83 in FIG. 2.

A major advantage of the jack and plug arrangement lies in the fact that it, like the mechanical connector, is symmetrical about its center axis. It need not have any particular rotational orientation to permit mating of its parts. The gimbal-like mounting of the jack portion makes it unnecessary to maintain close tolerance in the coincidence between the axis of the electrical and mechanical connectors.

Although I have shown and described certain specific embodiments of my invention, I am fully aware that many modifications thereof are possible. My invention, therefore, is not to be restricted except insofar as is necessitated by the prior art.

I claim:

1. In a submersible sonar apparatus of the type in which a central housing is surrounded by a baffle which is spaced from the housing and which carries a number of radially spaced sonic transducer devices on its outer surface, an improved connector by which the sonic transducer elements are electrically connected to the interior of the housing and by which the sonic transducer devices, baffle and housing are mechanically connected, the improved connector comprising:

a first cup-shaped mating element having a stem in the form of a tube extending axially from the exterior of its bottom wall;

a second cup-shaped mating element opening toward the opening of said first element having its bottom wall capable of fixed connection to a sonic transducer device;

the side wall of said second element being threaded in the region adjacent its bottom wall;

a coupler having cup-shaped threads on its side wall arranged to threadedly engage the threads of said second element, and a bottom wall having an axial opening;

the first element being assembled with the coupler such that the stem extends from the cup-shaped portion of said first element through the opening in the bottom wall of the coupler from the interior of the coupler;

a sealing annulus encompassing one of said first and second elements;

said elements, said annulus and said coupler having dimensions such that the annulus is compressed between the elements when the coupler is threadedly engaged with said second element with its bottom wall in compression with the bottom wall of said first element, the second element and the coupler having outer dimensions, when assembled, to extend through the wall of said baffle; and fastening means carried by the assembly of said elements and coupler for clamping the baffle into engagement with the sonic transducer and for fixing the stem to said housing;

one of said cup-shaped mating members being formed such that the forward section of its side wall has reduced diameter to fit slidably within the side wall of the other of said cup-shaped mating members and such that a mating shoulder is formed at the junction of the forward and rearward sections of its side wall which mating shoulder engages with a cooperating peripheral shoulder of the other mating member when they are assembled together;

said mating members being formed such that a first annular cavity is formed between them upon their being assembled, said sealing annulus being disposed in said first cavity.

2. The invention defined in claim 1 in which said mating elements are formed such that said first cavity is wedge-shaped in cross-section and has its smaller dimension in the direction away from the juncture of the mating shoulders of the members.

3. The invention defined in claim 2 which further comprises an electrical connector which includes two mating parts each carried by, but insulated from, a respectively associated one of said mating members and having dimensions to mate only when said mating members have mating relation.

4. The invention defined in claim 3 in which said fastening means comprises threads formed on the exterior surface of said coupler and a nut threadedly engaged on the threads of the coupler and capable of being turned into compression against the baffle;

said fastening means further comprising external threads at spaced points along said stem and a pair of nuts threadedly engaged with said threads of the stem.

5. The invention defined in claim 3 in which said mating parts comprise a jack and plug and in which the jack and plug are symmetrical, except at the center connector of the jack, about their central axis.

* * * * *